F. J. ROBINSON.
Churn.
No. 53,876. Patented April 10, 1866.
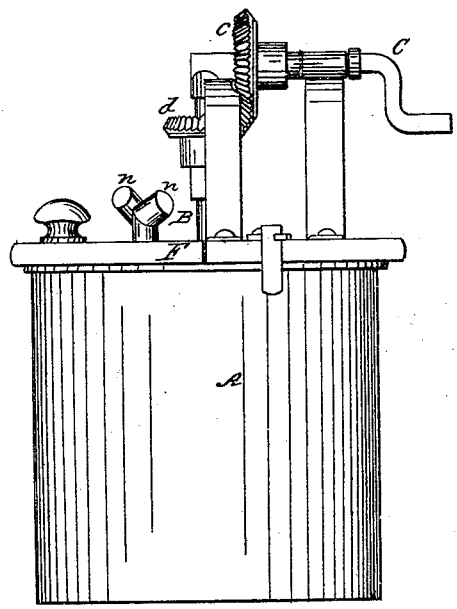
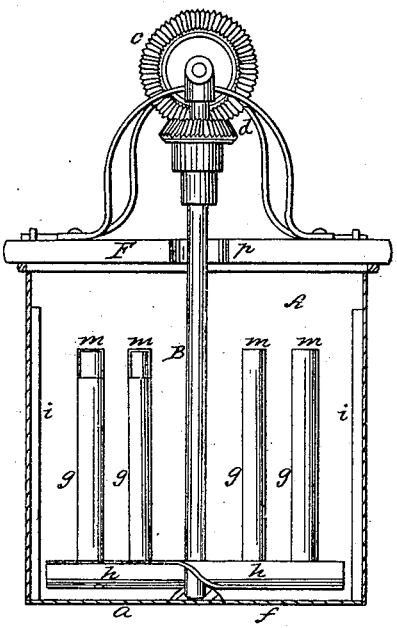
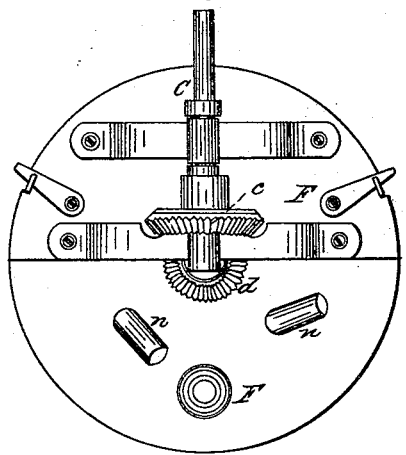
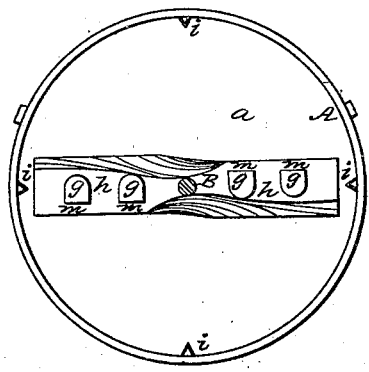
Witnesses:
E. J. Brown
J. S. Browne
Inventor:
F. J. Robinson
By his atty,
J. S. Brown

UNITED STATES PATENT OFFICE.

FRANK J. ROBINSON, OF LACONIA, NEW HAMPSHIRE.

IMPROVEMENT IN CHURNS.

Specification forming part of Letters Patent No. 53,876, dated April 10, 1866.

*To all whom it may concern:*

Be it known that I, FRANK J. ROBINSON, of Laconia, in the county of Belknap and State of New Hampshire, have invented an Improved Churn; and I do hereby declare that the following is a full and exact description thereof, reference being had to the accompanying drawings, making part of this specification.

Figure 1 is a side view of the churn; Fig. 2, a top view thereof; Fig. 3, a central vertical section of the same; Fig. 4, a top view, the cover being removed.

Like letters designate corresponding parts in all of the figures.

I construct a cylindrical churn-body, A, with vertical ribs $i\ i$ on the inside, reaching from the bottom $a$ nearly to the top. A central vertical dasher-shaft, B, is mounted on a step, $f$, at the bottom, while its upper end is provided with a bearing or bush in the gear framework mounted on the cover E. A crank, C, is used to drive the dasher, to the shaft of which it is geared by cog-wheels $c\ d$.

The dasher is peculiarly constructed for introducing atmospheric air into the cream and thoroughly intermingling it therewith, as follows: First, radial plates $h\ h$ extend from the dasher-shaft B near the lower end, and from the tops of these plates vertical, or nearly vertical, tubes $g\ g$ extend upward, so as to reach above the cream. The forward sides or faces of the radial plates $h\ h$ incline downward, so that as they move round a strong tendency to produce a vacuum behind them is caused. The vertical tubes open to this space below and behind the radial plates, so that this tendency to produce a vacuum draws a large amount of air down through the tubes and intermingles it with the cream. The upper ends of the tubes open at their rear sides, as at $m\ m$, Figs. 3 and 4, so that the cream cannot dash in and fill the tubes to the exclusion of the air.

In order to introduce fresh air freely into the churn, and to expel that which has already passed through the cream, a central aperture, $p$, is made through the cover for the admission of the air, and a number of tubes, $n\ n$, are inserted in the cover, near the periphery, for the egress of air, so that the centrifugal action of the dasher will cause an increased circulation of the air in and out. The tubes may be formed and arranged as represented in the drawings.

The ribs $i\ i$ act in conjunction with the dasher to commingle the cream and air through all parts and to increase the agitation of the cream.

What I claim as my invention, and desire to secure by Letters Patent, is—

1. The construction of the dasher with inclined radial plates $h\ h$ and vertical tubes $g\ g$, substantially as and for the purpose herein specified.

2. The combination of the central opening, $p$, for the ingress and the tubes $n\ n$ for the egress of air, in combination with the dasher, for the purpose set forth.

The above specification of my improved churn signed by me this 6th day of November, 1865.

FRANK J. ROBINSON.

Witnesses:
C. P. S. WARDWELL,
J. L. ODELL.